(No Model.)
N. TESLA.
ELECTRO MAGNETIC MOTOR.
No. 455,067. Patented June 30, 1891.
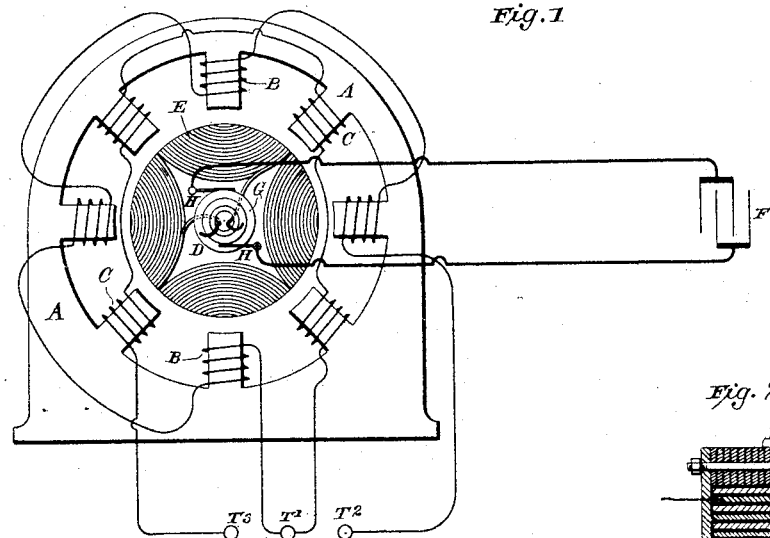
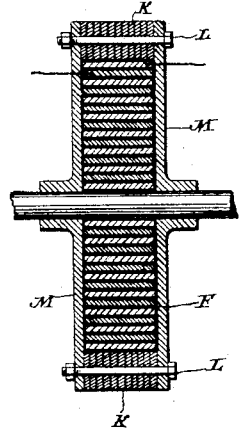
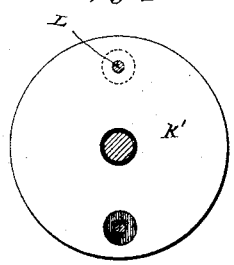
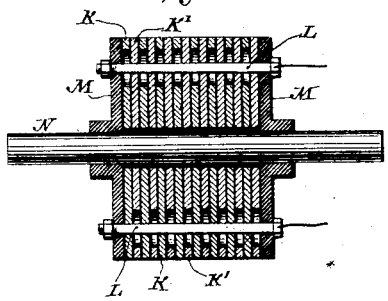
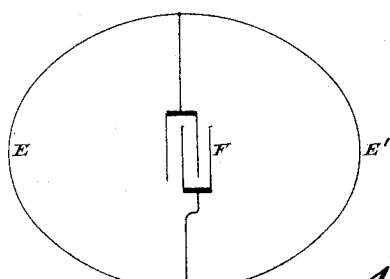
Witnesses
Raphael Netter
Frank B. Murphy
Inventor
Nikola Tesla
by
Duncan & Page
Attorneys.

UNITED STATES PATENT OFFICE.

NIKOLA TESLA, OF NEW YORK, N. Y.

ELECTRO-MAGNETIC MOTOR.

SPECIFICATION forming part of Letters Patent No. 455,067, dated June 30, 1891.

Application filed January 27, 1891. Serial No. 379,251. (No model.)

*To all whom it may concern:*

Be it known that I, NIKOLA TESLA, a subject of the Emperor of Austria, from Smiljan, Lika, border country of Austria-Hungary, and residing at New York, in the county and State of New York, have invented certain new and useful Improvements in Electro-Magnetic Motors, of which the following is a specification, reference being had to the accompanying drawings.

The subject of my present invention is an improvement primarily designed for application to alternating-current motors of the special type invented by me, and of which the operation is due to the action of alternating currents differing in phase and directed through or developed in independent energizing-circuits in the motor, and causing a shifting or rotation of the magnetic poles or their resultant attractive forces upon the rotating element or armature.

My improvements are based upon certain laws governing the action or effects produced by a condenser when connected to an electric circuit through which an alternating or in general an undulating current is made to pass. Some of these effects, and those most important in connection with my invention, are as follows: First, if the terminals or plates of a condenser be connected with two points of a circuit, the potentials of which are made to rise and fall in rapid succession, the condenser allows the passage or, more strictly speaking, the transference of a current, although its plates or armatures may be so carefully insulated as to prevent almost completely the passage of a current of unvarying strength or direction and of moderate electro-motive force; second, if a circuit the terminals of which are connected with the plates of the condenser possess a certain self-induction, the condenser will overcome or counteract to a greater or less degree, dependent upon well-understood conditions, the effects of such self-induction; third, if two points of a closed or complete circuit through which a rapidly rising and falling current flows be shunted or bridged by a condenser, a variation in the strength of the currents in the branches and also a difference of phase of the currents therein is produced. These effects I have utilized and applied in a variety of ways in the construction and operation of my motors, as by producing a difference in phase in the two energizing-circuits of an alternating-current motor by connecting the two circuits in derivation and connecting up a condenser in series in one of the circuits; but such applications seem to be obvious to one familiar with my motors and the facts above enumerated.

My present improvements, however, possess certain novel features of practical value and involve a knowledge of facts less generally known. These improvements comprise the use of a condenser or condensers in connection with the induced or armature circuit of a motor and certain details of the construction of such motors. In an alternating-current motor of the type to which I have particularly referred above, or in any other which has an armature coil or circuit closed upon itself, the latter represents not only an inductive resistance, but one which is periodically varying in value, both of which facts complicate and render difficult the attainment of the conditions best suited to the most efficient working of the motors. The most efficient working conditions, in other words, require, first, that for a given inductive effect upon the armature there should be the greatest possible current through the armature or induced coils, and, second, that there should always exist between the currents in the energizing and the induced circuits a given relation of phase. Hence whatever tends to decrease the self-induction and increase the current in the induced circuits will, other things being equal, increase the output and efficiency of the motor, and the same will be true of causes that operate to maintain the mutual attractive effect between the field-magnets and armature at its maximum. I secure these results by connecting with the induced circuit or circuits a condenser, in the manner hereinafter described, and I also, with this purpose in view, construct the motor in a special manner.

Referring to the drawings for a particular description of the invention, Figure 1 is a view, mainly diagrammatic, of an alternating-current motor to which my present invention is applied. Fig. 2 is a central section, in line with the shaft, of a special form of armature-core adapted to the invention. Fig. 3 is a similar section of a modification of the same. Fig. 4 is one of the sections of the core detached. Fig. 5 is a diagram showing a modified disposition of armature or induced circuits.

The general plan of the invention is illustrated in Fig. 1. A A in this figure represent the frame and field-magnets of an alternating-current motor, the poles or projections of which are wound with coils B and C, forming independent energizing-circuits connected either to the same or to independent sources of alternating currents, as is now well understood, so that the currents flowing through the circuits, respectively, will have a difference of phase. Within the influence of this field is an armature-core D, wound with coils E. In my motors of this description heretofore these coils have been closed upon themselves, or connected in a closed series; but in the present case each coil or the connected series of coils terminates in the opposite plates of a condenser F. For this purpose the ends of the series of coils are brought out through the shaft to collecting-rings G, which are connected to the condenser by contact-brushes H and suitable conductors, the condenser being independent of the machine. The armature-coils are wound or connected in such manner that adjacent coils produce opposite poles.

The action of this motor and the effect of the plan followed in its construction are as follows: The motor being started in operation and the coils of the field-magnets being traversed by alternating currents, currents are induced in the armature-coils by one set of field-coils, as B, and the poles thus established are acted upon by the other set, as C. The armature-coils, however, have necessarily a high self-induction, which opposes the flow of the currents thus set up. The condenser F not only permits the passage or transferrence of these currents, but also counteracts the effects of self-induction, and by a proper adjustment of the capacity of the condenser, the self-induction of the coils, and the periods of the currents the condenser may be made to overcome entirely the effect of the self-induction.

It is preferable on account of the undesirability of using sliding contacts of all kinds to associate the condenser with the armature directly, or make it a part of the armature. In some cases I build up the armature of annular plates K K, held by bolts L between heads M, which are secured to the driving-shaft, and in the hollow space thus formed I place a condenser F, generally by winding the two insulated plates thereof spirally around the shaft. In other cases I utilize the plates of the core itself as the plates of the condenser. For example, in Figs. 3 and 4, N is the driving-shaft, M M are the heads of the armature-core, and K K' the iron plates of which the core is built up. These plates are insulated from the shaft and from one another, and are held together by rods or bolts L. The bolts pass through a large hole in one plate and a small hole in the one next adjacent, and so on, connecting electrically all of plates K, as one armature of a condenser, and all of plates K' as the other.

To either of the condensers above described the armature-coils may be connected, as explained by reference to Fig. 1.

In motors in which the armature-coils are closed upon themselves—as, for example, in any form of alternating-current motor in which one armature coil or set of coils is in the position of maximum induction with respect to the field coils or poles, while the other is in the position of minimum induction—the coils are preferably connected in one series, and two points of the circuit thus formed are bridged by a condenser. This is illustrated in Fig. 5, in which E represents one set of armature-coils and E' the other. Their points of union are joined through a condenser F. It will be observed that in this disposition the self-induction of the two branches E and E' varies with their position relatively to the field-magnet, and that each branch is alternately the predominating source of the induced current. Hence the effect of the condenser F is twofold. First, it increases the current in each of the branches alternately, and, secondly, it alters the phrase of the currents in the branches, this being the well-known effect which results from such a disposition of a condenser with a circuit, as above described. This effect is favorable to the proper working of the motor, because it increases the flow of current in the armature-circuits due to a given inductive effect, and also because it brings more nearly into coincidence the maximum magnetic effects of the coacting field and armature-poles.

It will be understood, of course, that the causes that contribute to the efficiency of condensers when applied to such uses as above must be given due consideration in determining the practicability and efficiency of the motors. Chief among these is, as is well known, the periodicity of the current, and hence the improvements which I have herein described are more particularly adapted to systems in which a very high rate of alternation or change is maintained.

Although this invention has been illustrated herein in connection with a special form of motor, it will be understood that it is equally applicable to any other alternating-current motor in which there is a closed armature-coil wherein the currents are induced by the action of the field, and, furthermore, I would state that the feature of utilizing the plates or sections of a magnetic core for forming the condenser, I regard as applicable, generally, to other kinds of alternating-current apparatus.

Having now described my invention, what I claim is—

1. In an alternating-current motor, the combination, with the field-magnets and energizing-circuit, of an armature-circuit and a core adapted to be energized by currents induced in its circuit by the currents in the field-circuit, and a condenser connected with the armature-circuit only, as set forth.

2. In an alternating-current motor, the combination, with armature-coils in inductive relation to the field and connected in a closed circuit, of a condenser bridging said circuit, as set forth.

3. In an alternating-current motor, the combination, with an armature and two energizing-circuits formed by coils wound thereon in different inductive relations to the field and joined in a continuous or closed series, of a condenser the plates of which are connected, respectively, to the junctions of the circuits or coils, as set forth.

4. In an alternating-current motor, the combination, with the induced energizing coil or coils of the armature, of a condenser connected therewith and made a part of the armature or rotating element of the motor.

5. In an alternating-current motor, the combination, with an armature-core composed of insulated conducting-plates alternately connected to form a condenser, of an induced energizing coil or coils wound thereon and connected to the plates or armatures of the said condenser.

6. A magnetic core for alternating-current apparatus, composed of plates or sections insulated from each other and alternately connected to form the two parts or armatures of a condenser.

NIKOLA TESLA.

Witnesses:
PARKER W. PAGE,
FRANK B. MURPHY.